(12) United States Patent
Tokishige

(10) Patent No.: US 11,463,595 B2
(45) Date of Patent: Oct. 4, 2022

(54) IMAGE FORMING DEVICE

(71) Applicant: SHARP KABUSHIKI KAISHA, Osaka (JP)

(72) Inventor: Masato Tokishige, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/512,606

(22) Filed: Oct. 27, 2021

(65) Prior Publication Data

US 2022/0191337 A1    Jun. 16, 2022

(30) Foreign Application Priority Data

Dec. 10, 2020  (JP) .............................. JP2020-205067

(51) Int. Cl.
*H04N 1/00*    (2006.01)

(52) U.S. Cl.
CPC ..... *H04N 1/00488* (2013.01); *H04N 1/00408* (2013.01); *H04N 2201/0094* (2013.01)

(58) Field of Classification Search
CPC .......... H04N 1/00488; H04N 1/00408; H04N 1/00416; H04N 1/00419; H04N 2201/0094; G06F 3/1201
USPC ............................................... 358/1.13, 1.15
See application file for complete search history.

(56) References Cited

U.S. PATENT DOCUMENTS 7,812,989 B2 * 10/2010 Corona .............. G03G 15/5016
358/1.15
2010/0277762 A1 * 11/2010 Eguchi ............... G03G 15/5016
358/1.15

FOREIGN PATENT DOCUMENTS

JP    H07-302017 A    11/1995
JP    2004-164438 A    6/2004

* cited by examiner

*Primary Examiner* — Kent Yip
(74) *Attorney, Agent, or Firm* — ScienBiziP, P.C.

(57) ABSTRACT

An image forming device includes an image forming unit performing image forming, a notifier playing a voice guidance of a service related to image forming for a user, a display that displays a message to a user, and a controller controlling the image forming unit, the notifier, and the display. The controller allows the notifier to start the voice guidance to perform image forming services. When the service is for the first time to a user, the controller allows the display to transition to the next screen after the voice guidance is played to the end, and on the other hand, when the service is repeated for the second or subsequent times to a user, the controller allows the notifier to stop playing the voice guidance halfway after screen transition to the next screen becomes possible, and then the controller allows the display to transition to the next screen.

5 Claims, 15 Drawing Sheets

FIG. 18

| No. | SENTENCE UNIT OF VOICE GUIDANCE |
|---|---|
| 1 | NOW READING DATA |
| 2 | DO NOT PULL USB MEMORY FROM USB PORT. |
| 3 | AFTER READING ENDS, SCREEN TRANSITIONS. |

FIG. 20

| No. | SENTENCE UNIT OF VOICE GUIDANCE | CORRESPONDING ADDITIONAL VOICE GUIDANCE |
|---|---|---|
| 1 | NOW READING DATA | READING ENDED. SCREEN TRANSITIONS. |
| 2 | DO NOT PULL USB MEMORY FROM USB PORT. | PULL OUT MEMORY. SCREEN TRANSITIONS. |
| 3 | AFTER READING ENDS, SCREEN TRANSITIONS. | (NO ADDITIONAL VOICE GUIDANCE) |

IMAGE FORMING DEVICE

BACKGROUND OF THE INVENTION

Field of the Invention

The present invention relates to an image forming device, and more particularly, to an image forming device including a voice guidance function.

Description of the Background Art

Conventionally, of imaging devices such as multifunction devices installed in convenience stores or public facilities such as government offices, a known imaging device includes a voice guidance function when copying, printing, or the like is performed.

However, in a device including such a voice guidance function, it is not highly convenient for a user and also even for a user who fully understands the operation method to play the voice guidance to the end every time.

Therefore, in order to enhance user convenience, an invention of an image forming device that stops a voice output unit when an operation unit outputs an operation signal during playing of message voice information or when the operation unit outputs a voice stop signal has been disclosed (see, for example, JP 7-302017 A).

Also, an invention of a user interface device with a help function by which, when an operation menu that a user wants to know is specified during voice output of the operation menu, the voice being output is interrupted at that point has been disclosed (see, for example, JP 2004-164438 A).

As just described, of conventional devices each including a voice guidance function, a known device is configured such that after a specified voice guidance is played to the end, playing of the voice guidance is transitioned to a screen for performing the next operation or that when a user performs some kind of operation, the voice guidance is stopped even in the middle of the voice guidance.

However, even for a user who does not fully understand how to operate the device, the voice guidance is stopped halfway when some kind of operation is performed, which may cause the user to feel uneasy.

The present invention is made in view of the above circumstances, and an object of the present invention is to provide an image forming device that is more convenient for a user in playing the voice guidance than a conventional image forming device.

SUMMARY OF THE INVENTION (1) This invention provides an image forming device including an image forming unit that performs image forming, a notifier that plays a voice guidance of a service related to image forming for a user, a display that displays a message to a user, and a controller that controls the image forming unit, the notifier, and the display. In performing the service related to image forming, the controller allows the notifier to start the voice guidance. When the service is for the first time to a user, the controller allows the display to transition to the next screen after the voice guidance is played to the end, and on the other hand, when the service is repeated for the second or subsequent times to a user, the controller allows the notifier to stop playing the voice guidance halfway after screen transition to the next screen becomes possible, and then the controller allows the display to transition to the next screen.

In one aspect of the present invention, "the image forming device" is a device that forms an image to output the image, including a copying machine or a multifunction machine that includes a copying function such as a printer using an electrophotographic method for image forming with toner, a multifunction peripheral (MFP) that also includes functions other than copying, or the like.

In addition, "the notifier" is a unit that notifies the surroundings of a message or the like, for example, by allowing an audio speaker to generate voice sound such a message.

According to an aspect of the present invention, when the initial voice guidance is played, a user is forced to wait until the end of playing of the voice guidance. Therefore, the content of the voice guidance can be conveyed to the end. Meanwhile, playing of the voice guidance for the second and subsequent times is stopped as soon as the preparation for screen transition is completed. Consequently, the time during which the user is forced to wait is shortened, and the image forming device capable of playing the voice guidance more conveniently than before can be realized.

Further, a preferred aspect of the present invention will be described.

(2) The image forming device may further include a display that displays a message to a user. When allowing the notifier to stop the voice guidance halfway and then allowing the display to transition to the next screen, the controller may allow the display to display a predetermined message for the screen transition.

"The predetermined message for the screen transition" is a message that should be displayed to a user depending on the content of processing when the screen is transitioned.

For example, when data reading is completed and the screen is transitioned to the next screen, a predetermined message "Data reading ended." or the like is displayed on the display.

In this way, when playing of the voice guidance is stopped as soon as the preparation for screen transition is completed in playing of the voice guidance for the second or subsequent times, the additional voice guidance stating that screen transition will be performed is played so as not to make a user feel uneasy. Therefore, the image forming device capable of playing the voice guidance more conveniently than before can be realized.

(3) When allowing the notifier to stop playing the voice guidance halfway, the controller may allow the notifier to play an additional predetermined voice guidance for the screen transition.

"The additional predetermined voice guidance for the screen transition" is a voice guidance that should be played for a user depending on the content of processing when the voice guidance is stopped halfway.

For example, when data reading is completed and the screen is transitioned to the next screen, a predetermined voice guidance "Data reading ended; therefore, the screen will be transitioned to the next screen." or the like is played.

In this way, when playing of the voice guidance is stopped as soon as the preparation for screen transition is completed in playing of the voice guidance for the second or subsequent times, the additional voice guidance stating that screen transition will be performed is played so as not to make a user feel uneasy, and thereafter the screen is transitioned. Therefore, the image forming device capable of playing the voice guidance more conveniently than before can be realized.

(4) When allowing the notifier to stop playing the voice guidance halfway, the controller may allow the notifier to stop playing the voice guidance at the end of a predetermined sentence unit.

In this way, when playing of the voice guidance is stopped as soon as the preparation for screen transition is completed in playing of the voice guidance for the second or subsequent times, playing is stopped at the end of the predetermined sentence unit for an appropriate timing. Therefore, the image forming device capable of playing the voice guidance more conveniently than before without making a user feel uneasy for malfunction or the like can be realized.

(5) After allowing the notifier to stop playing the voice guidance at the end of the predetermined sentence unit, the controller may allow the notifier to play an additional predetermined voice guidance corresponding to an immediately preceding sentence unit.

In this way, when playing of the voice guidance is stopped as soon as the preparation for screen transition is completed in playing of the voice guidance for the second or subsequent times, playing is stopped at the end of the predetermined sentence unit for an appropriate timing and then an additional voice guidance corresponding to the immediately preceding sentence unit is played. Therefore, the image forming device capable of playing the voice guidance more conveniently than before without making a user feel uneasy can be realized.

BRIEF DESCRIPTION OF THE DRAWINGS

FIG. 18 is a table illustrating an example of a sentence unit of the voice guidance of the digital multifunction machine according to the fourth embodiment of the present invention.

FIG. 20 is a table illustrating an example of a sentence unit of the voice guidance and an additional voice guidance corresponding to the sentence unit of the digital multifunction machine according to the fifth embodiment of the present invention.

DESCRIPTION OF THE PREFERRED EMBODIMENTS

Hereinafter, the present invention will be described in detail with the drawings. Note that the following explanations are merely examples in all respects and are not to be interpreted to limit the present invention.

First Embodiment

A digital multifunction machine 1 that is a first embodiment of an image forming device of the present invention will be described based on FIGS. 1 to 4.

Figure 1:
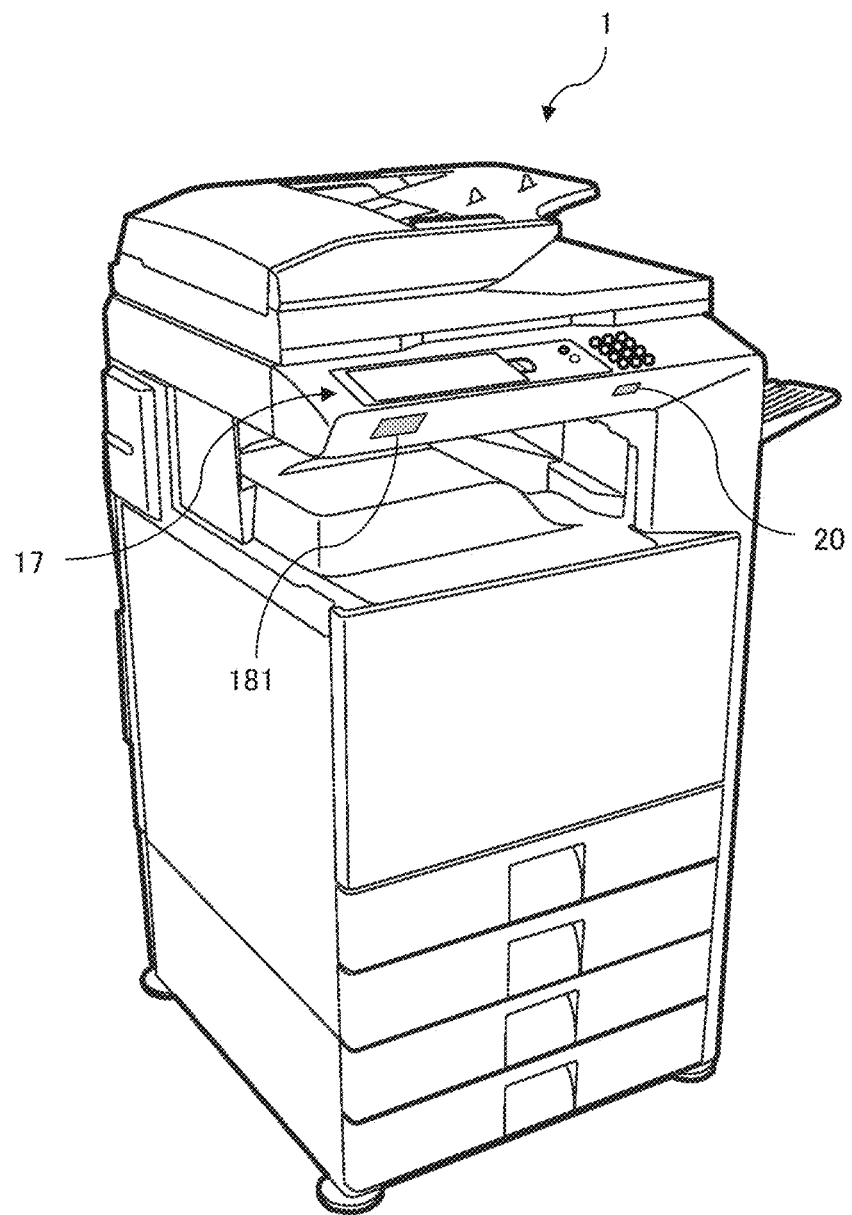
FIG. 1 is a perspective view illustrating the outer appearance of a digital multifunction machine according to a first embodiment of the present invention.

FIG. 1 is a perspective view illustrating the outer appearance of the digital multifunction machine 1 including a voice guidance function according to the first embodiment of the present invention.

Figure 2:
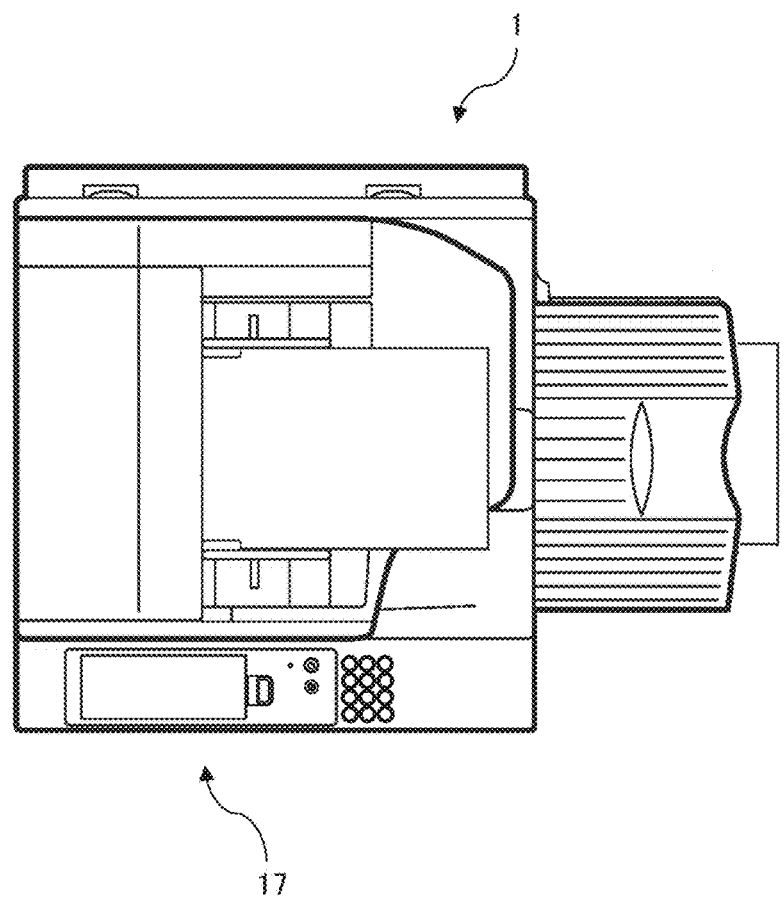
FIG. 2 is a plan view of the digital multifunction machine illustrated in FIG. 1.

FIG. 2 is a plan view of the digital multifunction machine 1 illustrated in FIG. 1.

Figure 3:
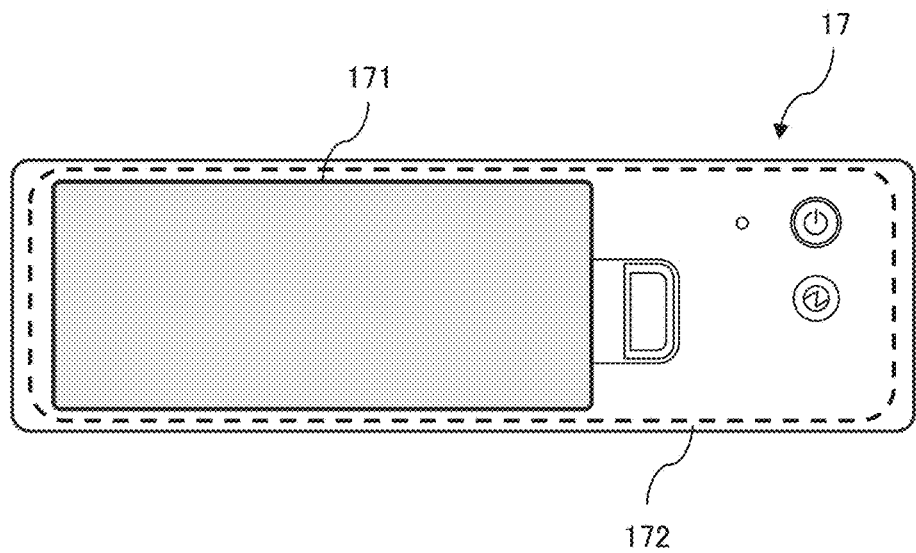
FIG. 3 is an explanatory diagram illustrating an operation panel of the digital multifunction machine illustrated in FIG. 1.

FIG. 3 is an explanatory diagram illustrating an operation panel 17 of the digital multifunction machine 1 illustrated in FIG. 1.

Figure 4:
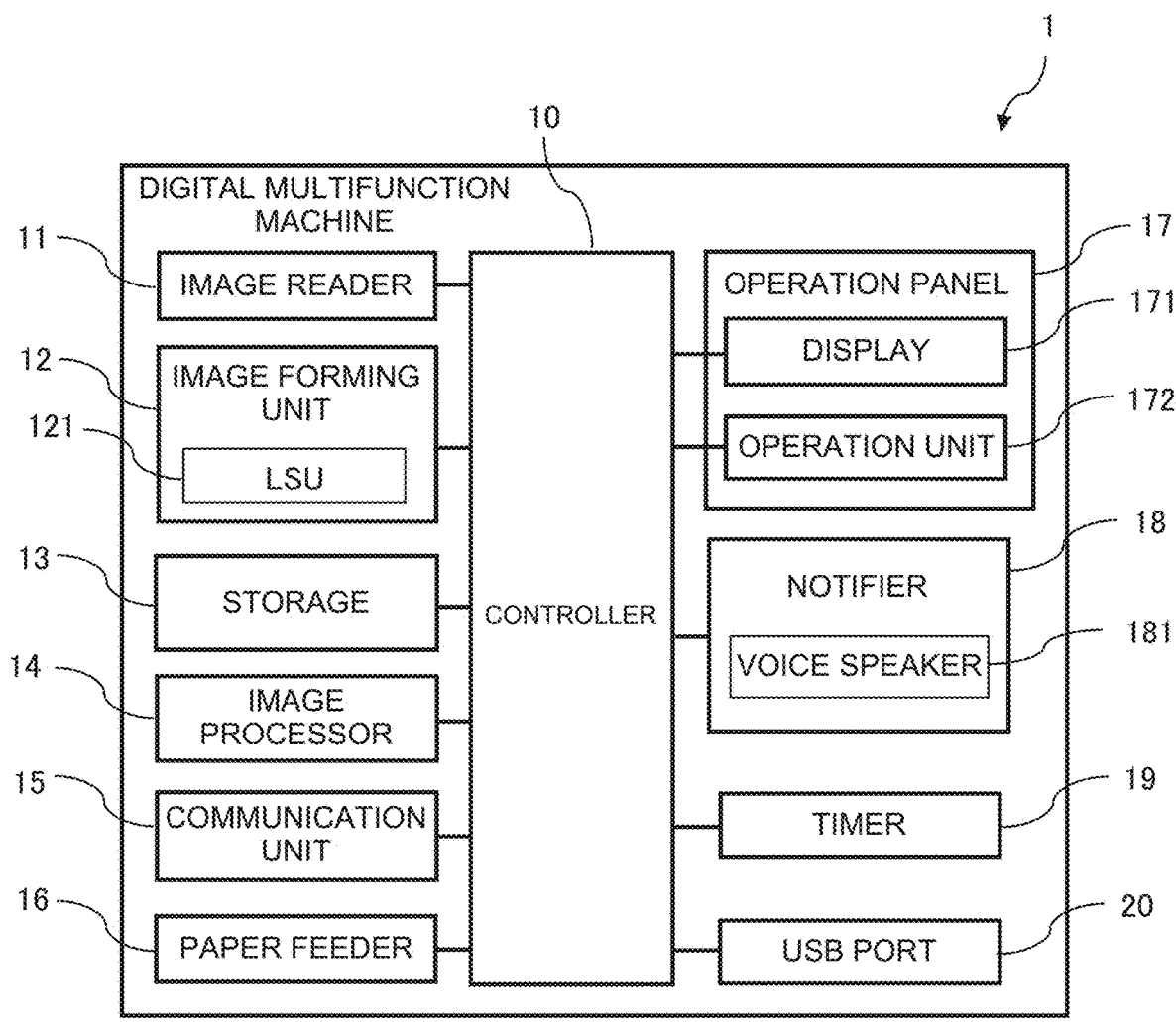
FIG. 4 is a block diagram illustrating a schematic configuration of the digital multifunction machine illustrated in FIG. 1.

FIG. 4 is a block diagram illustrating a schematic configuration of the digital multifunction machine 1 illustrated in FIG. 1.

In addition, the invention is not limited to the digital multifunction machine 1, and can be applied to all devices each including a voice guidance function, for example, adjustment machines at hospitals, banks, gas stations, or the like, automatic ticket vending machines that sell train tickets, meal tickets, or the like, self cash registers, portable terminals such as tablets, electronic blackboards, or the like.

The digital multifunction machine 1 is a device such as a digital multifunction machine or a multifunction peripheral (MFP), which digitally processes image data and includes a copying function, a scanner function, and a facsimile function.

As illustrated in FIGS. 1 and 2, the digital multifunction machine 1 includes the operation panel 17 and an audio speaker 181.

As illustrated in FIG. 3, the operation panel 17 includes a display 171 and an operation unit 172.

The digital multifunction machine 1 executes a job such as printing, copying, scanning, or image transmission (Scan to Email or Scan to FTP) based on an instruction from a user, which is received via the operation unit 172 or a communication unit 15 (see FIG. 4).

Next, the schematic configuration of the digital multifunction machine 1 will be described based on FIG. 4.

FIG. 4 is a block diagram illustrating the schematic configuration of the digital multifunction machine 1 illustrated in FIG. 1.

As illustrated in FIG. 4, the digital multifunction machine 1 includes a controller 10, an image reader 11, an image forming unit 12, a storage 13, an image processor 14, the communication unit 15, a paper feeder 16, the operation panel 17, a notifier 18, a timer 19, and a USB port 20.

Hereinafter, components of the digital multifunction machine 1 will be described.

The controller 10 controls the digital multifunction machine 1 in an integrated manner and includes a CPU, a RAM, a ROM, various interface circuits, and the like.

In order to control an entire operation of the digital multifunction machine 1, the controller 10 monitors and controls detection of each sensor and all loads on a motor, a clutch, the operation panel 17, and the like.

The image reader 11 is a unit that detects a document placed on a document glass or transported from a document tray, reads the document, and generates image data. Also, the image reader 11 is a unit that acquires image data generated by an external information processor (not illustrated), a facsimile machine (not illustrated), or the like.

Note that in acquiring image data from an external information processor or the like, the image reader may be a unit that acquires the image data via a wired or wireless network or that acquires the image data recorded on a USB stick or the like, or may be a combination of these units.

The image forming unit 12 is a unit that prints out the image data generated by the image processor 14 on paper and includes an LSU 121.

The LSU 121 is a device that forms an electrostatic latent image by irradiating a surface of a photoconductor drum in an electrically charged state with a laser beam corresponding to image information of digital signals acquired by the image reader 11.

The storage 13 is an element or a storage medium that stores information necessary to realize various functions of the digital multifunction machine 1, a control program, or the like.

For example, a semiconductor device such as a RAM or a ROM, or a storage medium such as a hard disk, a flash storage, or a solid status drive (SSD) is used.

Note that a program and data may be held in different devices. For example, an area that holds the data is configured by a hard disk drive, and an area that holds the program is configured by a flash storage.

The image processor 14 is a unit that converts the document image read by the image reader 11 into appropriate electrical signals to generate image data, and processes, in accordance with a command from the operation unit 172, the image data input from the image reader 11 such that the image data is suitable for output for enlargement/reduction in scale or the like.

The communication unit 15 is a unit that communicates with an external computer or a portable information terminal, an external information processor or a facsimile device, and the like via a network or the like, and transmits and receives various information such as e-mails or faxes to and from these external communication devices.

The paper feeder 16 is a unit that conveys a sheet of paper stored in a paper feed cassette or a manual feed tray to the image forming unit 12.

The operation panel 17 includes a display panel formed of a liquid crystal panel or the like, and a touch panel, such as a capacitance touch panel, which is disposed overlapped with the display panel to detect a position touched by a finger.

The display 171 is a unit that displays various information.

The display 171 includes, for example, a CRT display, a liquid crystal display, an EL display, or the like, and is a display device such as a monitor or a line display for allowing an operating system or an application software to display electronic data such as a processing status.

The controller 10 displays, through the display 171, the operation and status of the digital multifunction machine 1.

The operation unit 172 is an interface for operating the digital multifunction machine 1, and is a unit that receives a command from a user.

The notifier 18 includes the audio speaker 181.

The notifier 18 is a unit that notifies the surroundings of a warning, a message, or the like by allowing the audio speaker 181 to generate buzzer sound, a message, or the like.

The timer 19 is a unit that measures time, and for example, acquires the time through an internal clock or a network.

The USB port 20 is a port that includes a connection terminal to which a USB memory is detachably connected, detects the connected USB memory, and reads and writes data in the USB memory.

Example of Voice Guidance Processing

Next, an example of voice guidance processing of the digital multifunction machine 1 according to first embodiment of the present invention will be described based on FIGS. 5 to 12.

Figure 5:
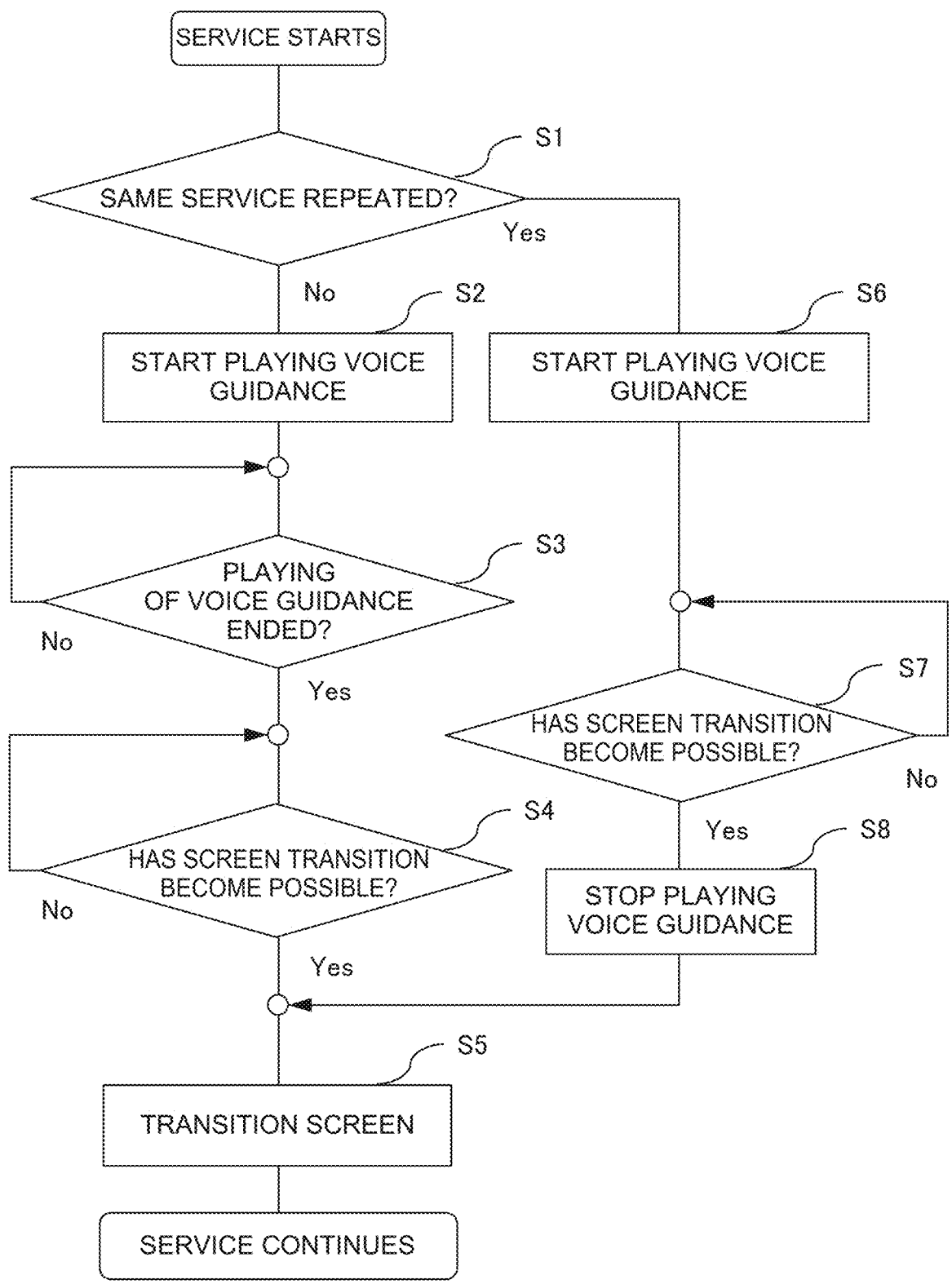
FIG. 5 is a flowchart illustrating a flow of voice guidance processing of the digital multifunction machine illustrated in FIG. 1.

FIG. 5 is a flowchart illustrating a flow of voice guidance processing of the digital multifunction machine 1 illustrated in FIG. 1.

In the first embodiment, an example of voice guidance processing when plugging a USB memory into the USB port 20, selecting data in the USB memory, and printing is introduced.

Figure 6:
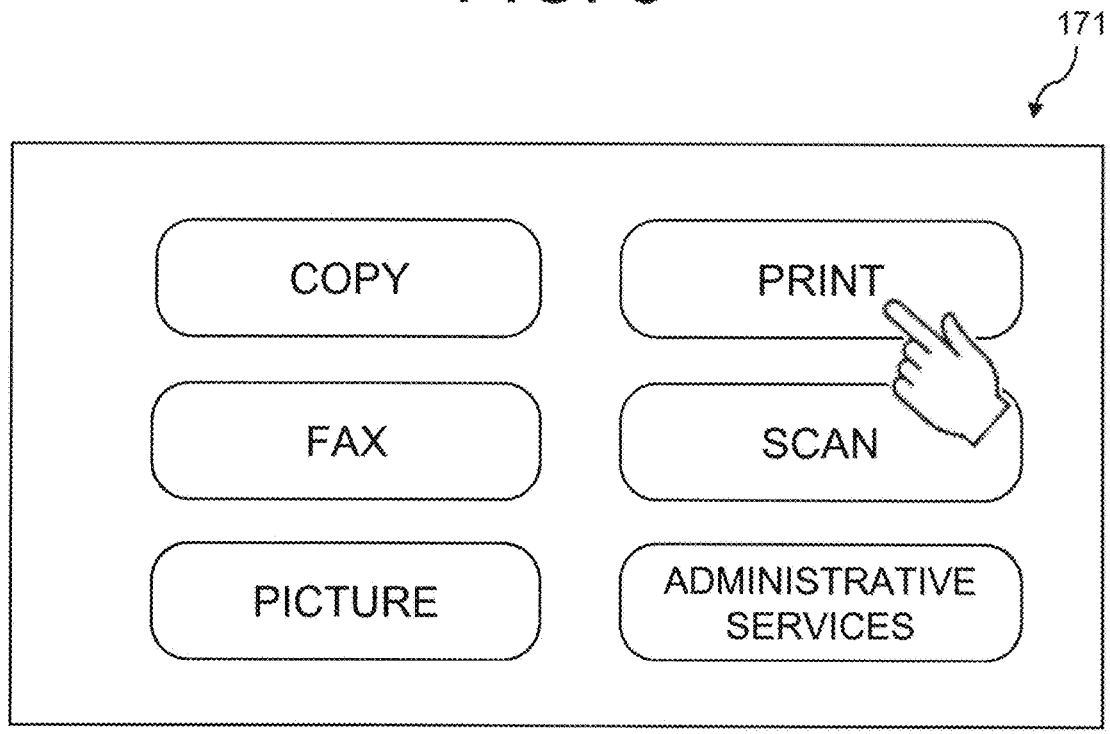
FIG. 6 is an explanatory diagram illustrating an example of an initial screen for services, which is displayed on a display of the digital multifunction machine illustrated in FIG. 1.

FIG. 6 is illustrating an explanatory diagram illustrating an example of an initial screen for services, which is displayed on the display 171 of the digital multifunction machine 1 illustrated in FIG. 1.

Figure 7:
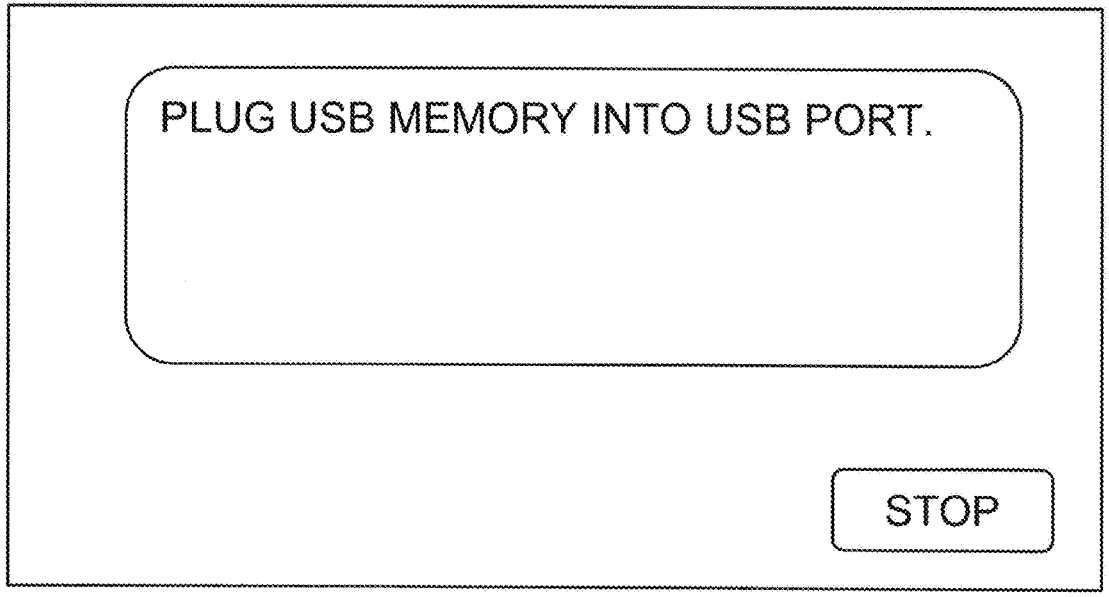
FIG. 7 is an explanatory diagram illustrating an example of a screen for starting a printing service, which is displayed on the display of the digital multifunction machine illustrated in FIG. 1.

FIG. 7 is an explanatory diagram illustrating an example of a screen for starting a printing service, which is displayed on the display 171 of the digital multifunction machine 1 illustrated in FIG. 1.

Figure 8:
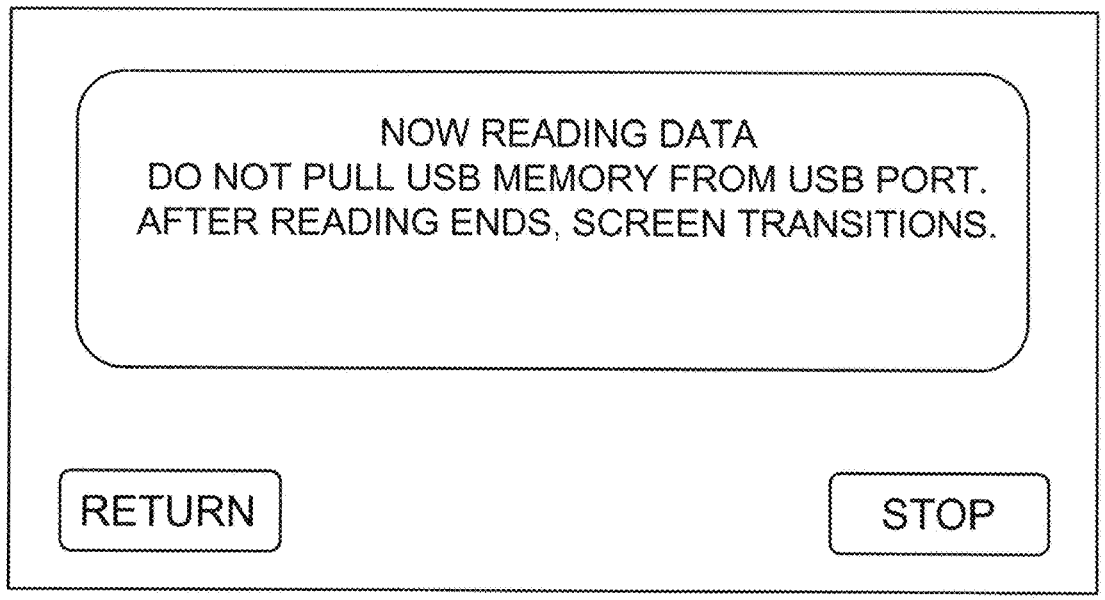
FIG. 8 is an explanatory diagram illustrating an example of a screen in the middle of reading data, which is displayed on the display of the digital multifunction machine illustrated in FIG. 1.

FIG. 8 is an explanatory diagram illustrating an example of a screen in the middle of reading data, which is displayed on the display 171 of the digital multifunction machine 1 illustrated in FIG. 1.

Figure 9:
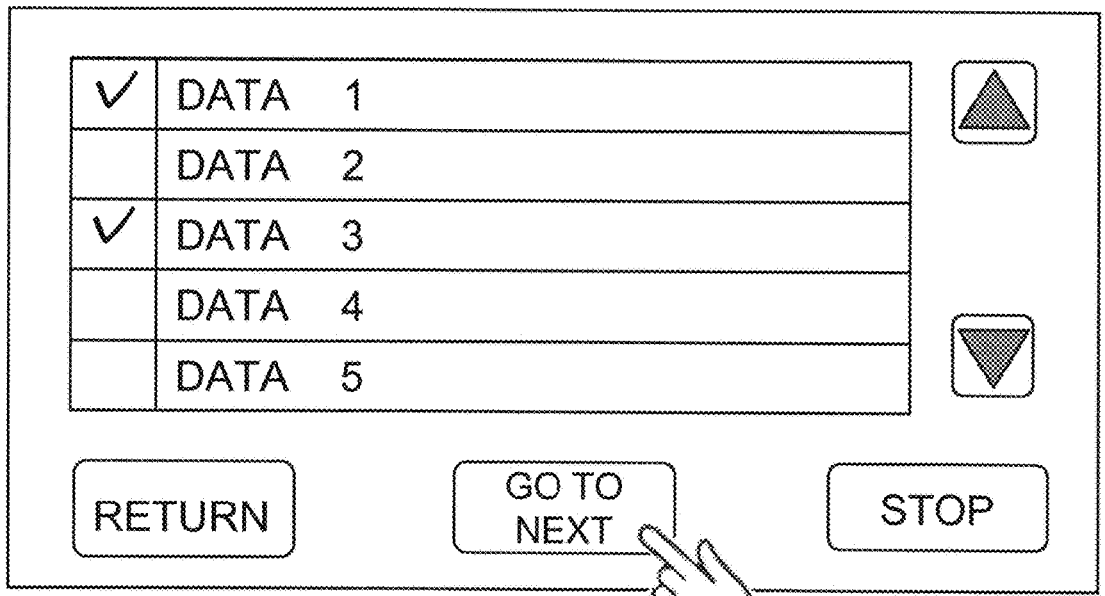
FIG. 9 is an explanatory diagram illustrating an example of a screen for selecting data, which is displayed on the display of the digital multifunction machine illustrated in FIG. 1.

FIG. 9 is an explanatory diagram illustrating an example of a screen for selecting data, which is displayed on the display 171 of the digital multifunction machine 1 illustrated in FIG. 1.

Figure 10:
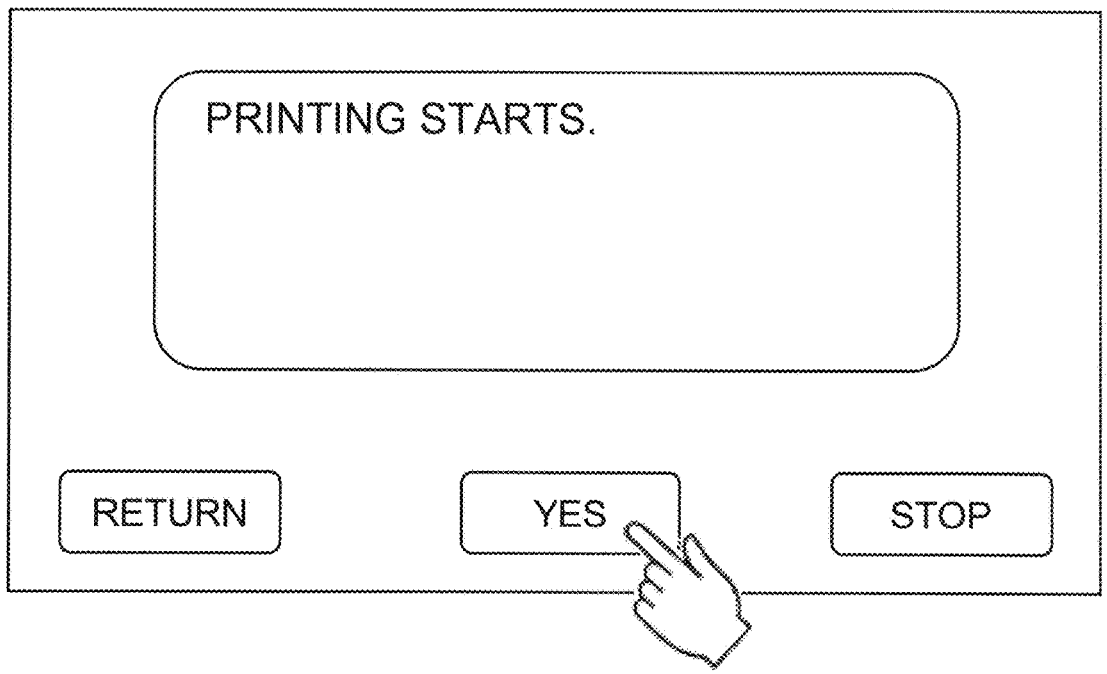
FIG. 10 is an explanatory diagram illustrating an example of a screen for confirming a printing start, which is displayed on the display of the digital multifunction machine illustrated in FIG. 1.

FIG. 10 is an explanatory diagram illustrating an example of a screen for confirming a printing start, which is displayed on the display 171 of the digital multifunction machine 1 illustrated in FIG. 1.

Figure 11:
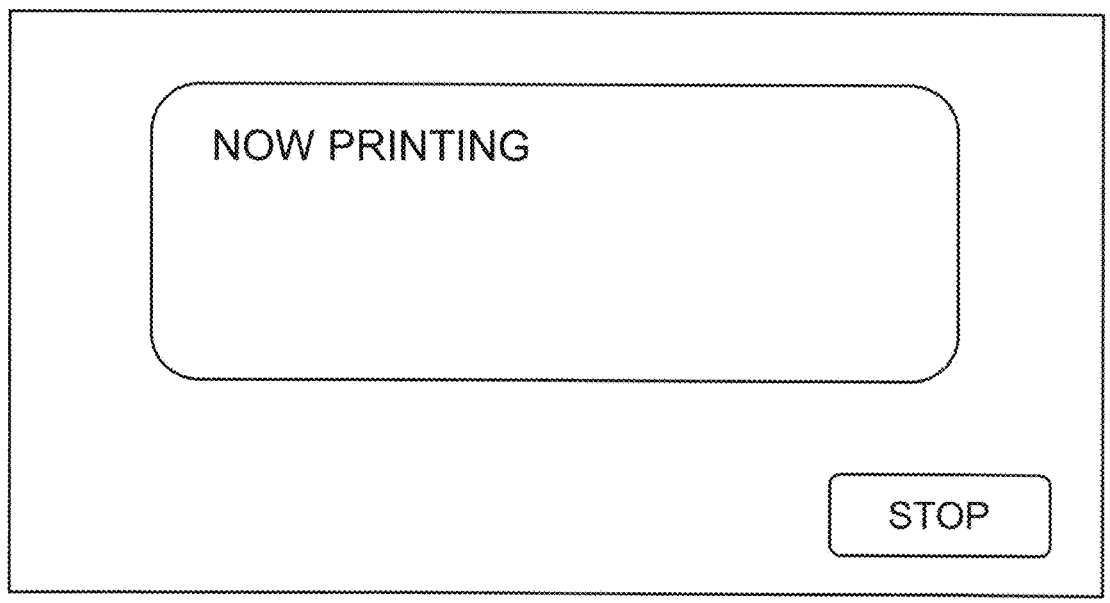
FIG. 11 is an explanatory diagram illustrating an example of a screen in the middle of printing, which is displayed on the display of the digital multifunction machine illustrated in FIG. 1.

FIG. 11 is an explanatory diagram illustrating an example of a screen in the middle of printing, which is displayed on the display 171 of the digital multifunction machine 1 illustrated in FIG. 1.

Figure 12:
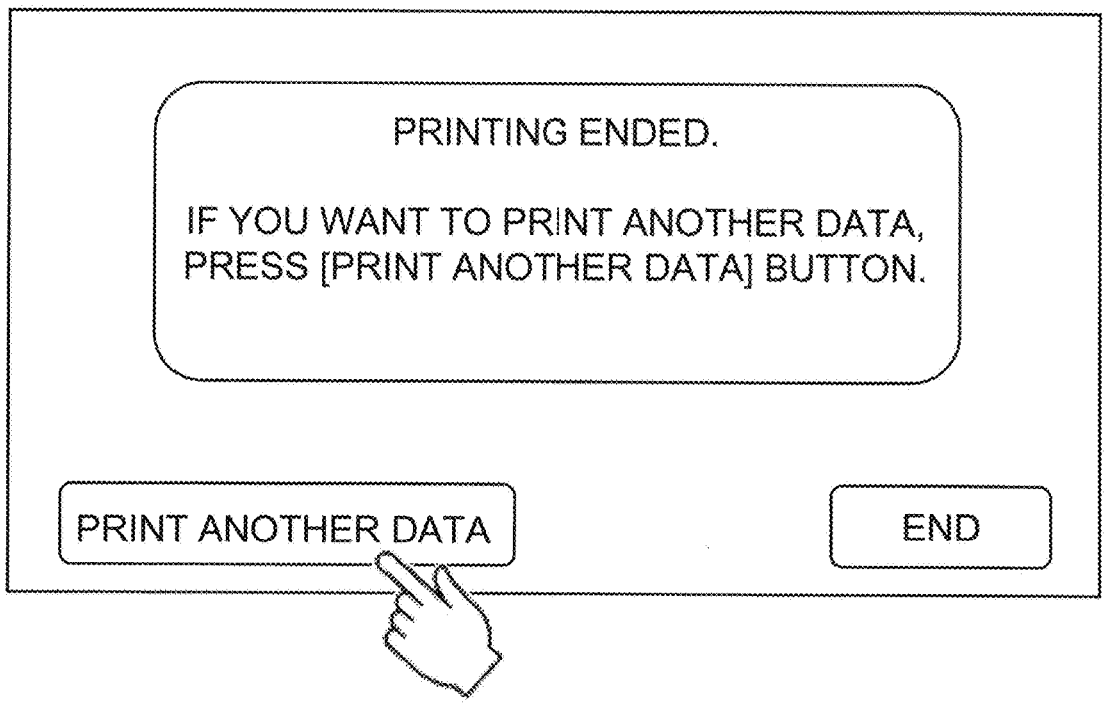
FIG. 12 is an explanatory diagram illustrating an example of a screen at the end of printing, which is displayed on the display of the digital multifunction machine illustrated in FIG. 1.

FIG. 12 is an explanatory diagram illustrating an example of a screen at the end of printing, which is displayed on the display 171 of the digital multifunction machine 1 illustrated in FIG. 1.

When a user selects any service in the initial screen, the controller 10 determines in step S1 of FIG. 5 whether the execution of the service is a repetition of the same service for the user (step S1).

When the execution of the service is not a repetition of the same service for the user, that is, when it is the first time for the user to execute the service (when a determination of step S1 is No), in step S2, the controller 10 allows the notifier 18 to start playing the voice guidance (step S2).

In the initial screen of FIG. 6, when the user selects the "Print" service, the message "Plug the USB memory into the USB port" is displayed on the display 171 as illustrated in FIG. 7, and the notifier 18 starts playing the voice guidance.

Next, in step S3, the controller 10 determines whether playing of the voice guidance has ended (step S3).

When playing of the voice guidance has not ended (when a determination of step S3 is No), the controller 10 repeats the determination of step S3.

On the other hand, when playing of the voice guidance has ended (when a determination of step S3 is Yes), the controller 10 determines in step S4 whether screen transition has become possible (step S4).

When screen transition has not become possible (when a determination of step S4 is No), the controller 10 repeats the determination of step S4.

On the other hand, when screen transition has become possible (when a determination of step S4 is Yes), in step S5, the controller 10 allows the display 171 to transition the screen (step S5).

In addition, without limited to the examples of FIGS. 6 and 7, when in a single service, transition to a plurality of screens is made and different types of voice guidance are played, processing of steps S2 to S5 shall be repeated.

For example, when the user plugs a USB memory into the USB port 20, the machines starts reading data.

At this time, the message "Now reading data. Do not pull the USB memory from the USB port. After reading ends, the screen transitions." is displayed on the display 171 as illustrated in FIG. 8, and the notifier 18 starts playing the voice guidance.

Then, when the voice guidance ends and data reading ends, the screen transitions to the screen for selecting data as illustrated in FIG. 9.

In FIG. 9, when the user selects data 1 and 3 and then presses the "Next" button, the screen transitions to the screen for starting printing as illustrated in FIG. 10.

In the example of FIG. 10, the message "Printing starts." is displayed on the display 171, and the notifier 18 starts playing the voice guidance.

In FIG. 10, when the user presses the "Yes" button, the screen transitions to the screen during printing as illustrated in FIG. 11.

In the example in FIG. 11, the message "Now printing" is displayed on the display 171, and the notifier 18 starts playing the voice guidance.

Then, when printing ends, the screen transitions to the screen at the end of printing as illustrated in FIG. 12.

In the example of FIG. 12, the message "If you want to print another data, press [Print another data] button." is displayed on the display 171, and the notifier 18 starts playing the voice guidance.

Here, as illustrated in the example of FIG. 12, when the user presses the "Print another data" button, voice guidance processing is performed in accordance with processing of steps S6 to S8 of FIG. 5.

When the execution of the service is a repetition of the same service for the user in step S1 of FIG. 5 (when a determination of step S1 is YES), in step S6, the controller 10 allows the notifier 18 to start playing the voice guidance (step S6).

Next, the controller 10 determines in step S7 whether screen transition has become possible (step S7).

When screen transition has not become possible (when a determination of step S7 is No), the controller 10 repeats the determination of step S7.

On the other hand, when screen transition has become possible (when a determination of step S7 is Yes), in step S8, the controller 10 allows the notifier 18 to stop playing the voice guidance, regardless of whether playing of the voice guidance has ended (step S8).

Thereafter, in step S5, the controller 10 allows the display 171 to transition the screen (step S5).

As just described, when the initial voice guidance is played, the user is forced to wait until the end of playing of the voice guidance. Therefore, the content of the voice guidance can be conveyed to the end. Meanwhile, playing of the voice guidance for the second and subsequent times is stopped as soon as the preparation for screen transition is completed. Consequently, the time during which the user is forced to wait is shortened, and the digital multifunction machine 1 capable of playing the voice guidance more conveniently than before can be realized.

Second Embodiment

Next, an example of voice guidance processing of the digital multifunction machine 1 according to a second embodiment of the present invention will be described based on FIGS. 13 to 15.

The schematic configuration of the digital multifunction machine 1 according to the second embodiment is the same as that of the first embodiment (FIG. 4); therefore, the description is omitted.

Figure 13:
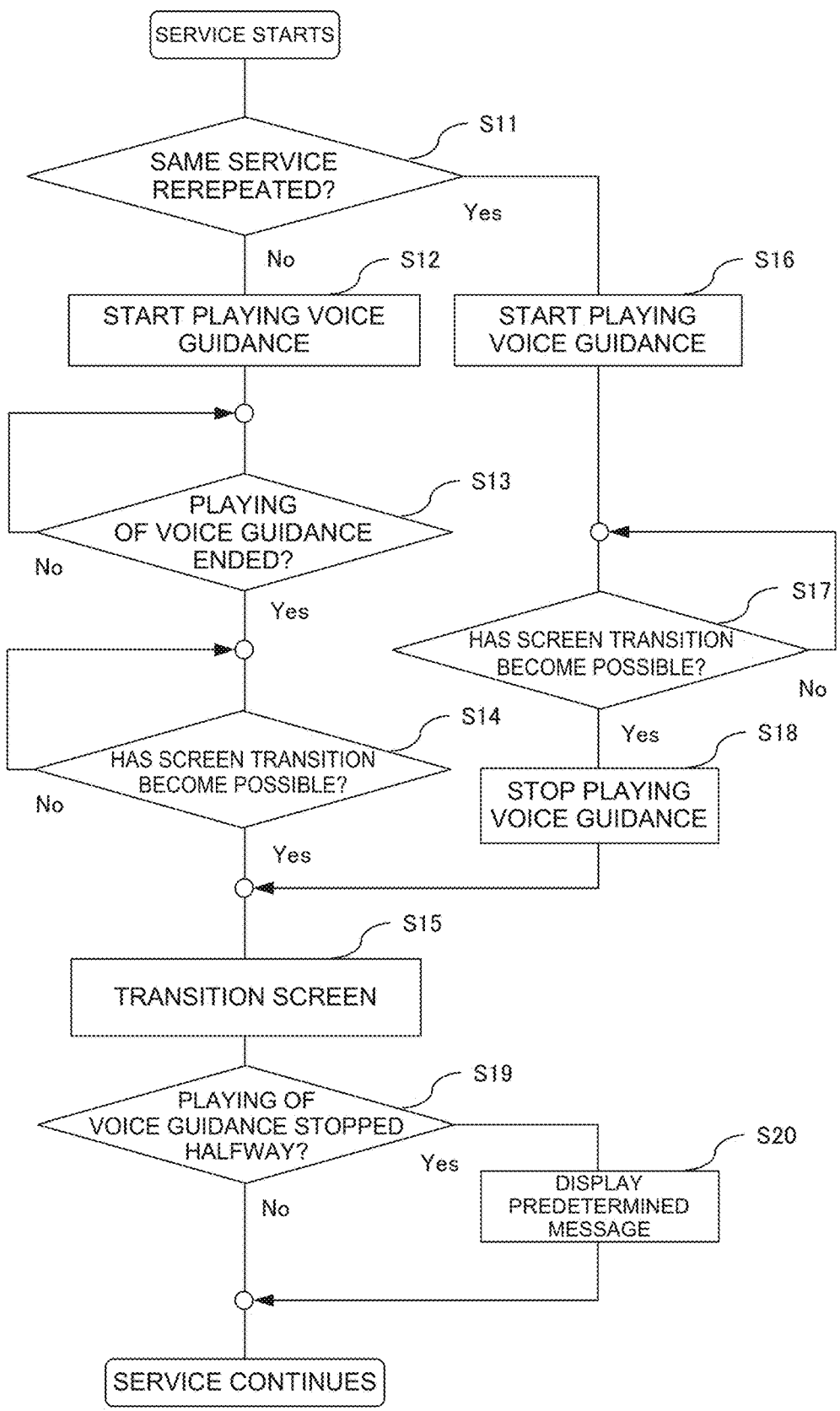
FIG. 13 is a flowchart illustrating a flow of voice guidance processing of the digital multifunction machine according to a second embodiment of the present invention.

FIG. 13 is a flowchart illustrating a flow of voice guidance processing of the digital multifunction machine 1 according to the second embodiment of the present invention.

Processing of steps S11 to S18 in FIG. 13 corresponds to processing of steps S1 to S8 in FIG. 5; therefore, the description is omitted.

Here, processing of steps S19 and S20 of FIG. 13, which is not described in the first embodiment will be described.

After allowing the display 171 to transition the screen in step S15 of FIG. 13 (step S15), the controller 10 determines in step S19 whether playing of the voice guidance has stopped halfway (step S19).

When playing of the voice guidance has not stopped halfway (when a determination of step S19 is No), the controller 10 allows the service to continue.

On the other hand, when playing of the voice guidance has stopped halfway (when a determination of step S19 is Yes), in step S20, the controller 10 allows the display 171 to display a predetermined message (step S20).

Figure 14:
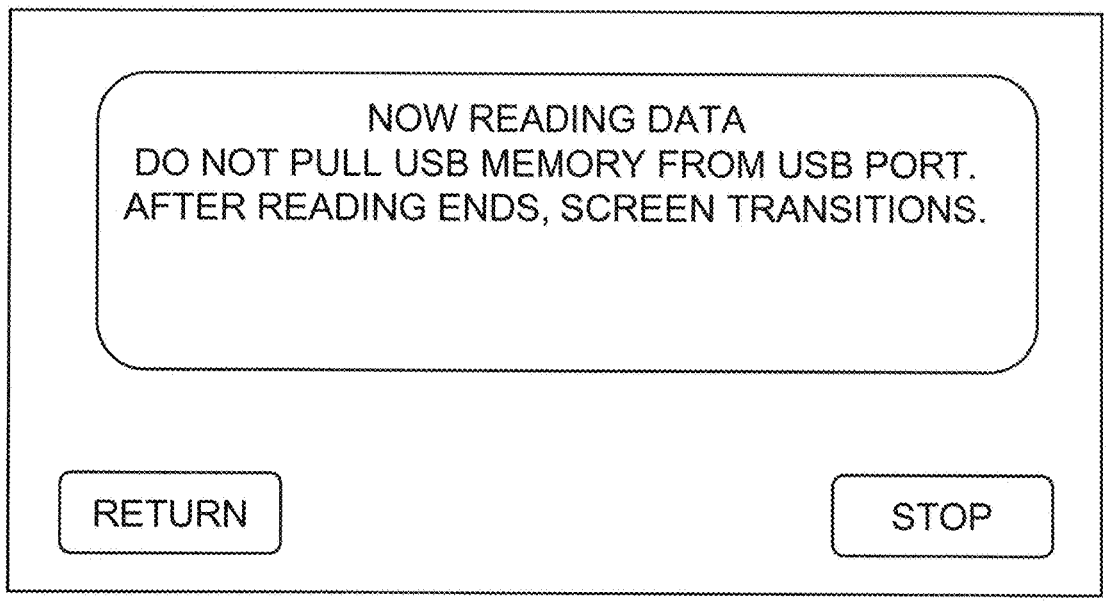
FIG. 14 is an explanatory diagram illustrating an example of a screen in the middle of data reading, which is displayed on the display of the digital multifunction machine according to the second embodiment of the present invention.

FIG. 14 is an explanatory diagram illustrating an example of a screen in the middle of reading data, which is displayed on the display 171 of the digital multifunction machine 1 according to the second embodiment of the present invention.

Figure 15:
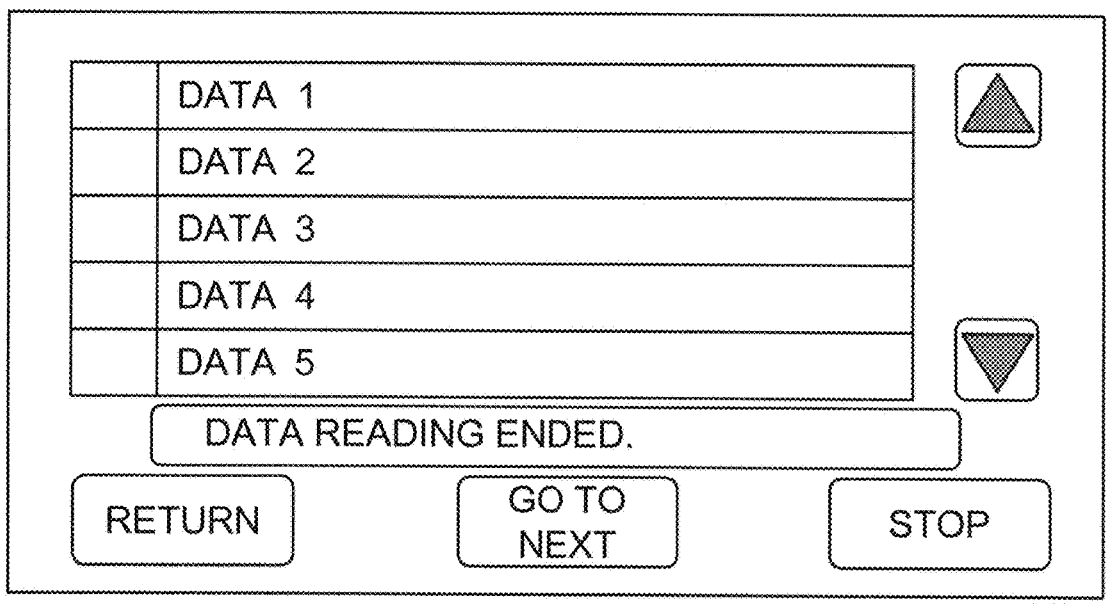
FIG. 15 is an explanatory diagram illustrating an example of a screen for selecting data and a message, which is displayed on the display of the digital multifunction machine according to the second embodiment of the present invention.

FIG. 15 is an explanatory diagram illustrating an example of a screen for selecting data and a message, which is displayed on the display 171 of the digital multifunction machine 1 according to the second embodiment of the present invention.

As illustrated in FIG. 14, the message "Now reading data. Do not pull the USB memory from the USB port. After reading ends, the screen transitions." is displayed on the display 171, and the notifier 18 starts playing the voice guidance.

At this time, when the voice guidance is played for the second or subsequent times, the controller 10 allows the notifier 18 to stop playing the voice guidance and allows the display 171 to transition the screen to the next screen (screen for selecting data).

In this case, playing of the voice guidance has stopped halfway; therefore, the user may feel uneasy that the digital multifunction machine 1 may be malfunctioned.

Accordingly, in order not to cause such uneasiness, as illustrated in FIG. 15, the predetermined message "Data reading ended." is displayed on the display 171.

As just described, when playing of the voice guidance is stopped as soon as the preparation for screen transition is completed in playing of the voice guidance for the second or subsequent times, the predetermined message is displayed so as not to make the user feel uneasy. Therefore, the digital multifunction machine 1 capable of playing the voice guidance more conveniently than before can be realized.

Third Embodiment

Next, an example of voice guidance processing of the digital multifunction machine 1 according to a third embodiment of the present invention will be described based on FIG. 16.

The schematic configuration of the digital multifunction machine 1 according to the third embodiment is the same as that of the first embodiment (FIG. 4); therefore, the description is omitted.

Figure 16:
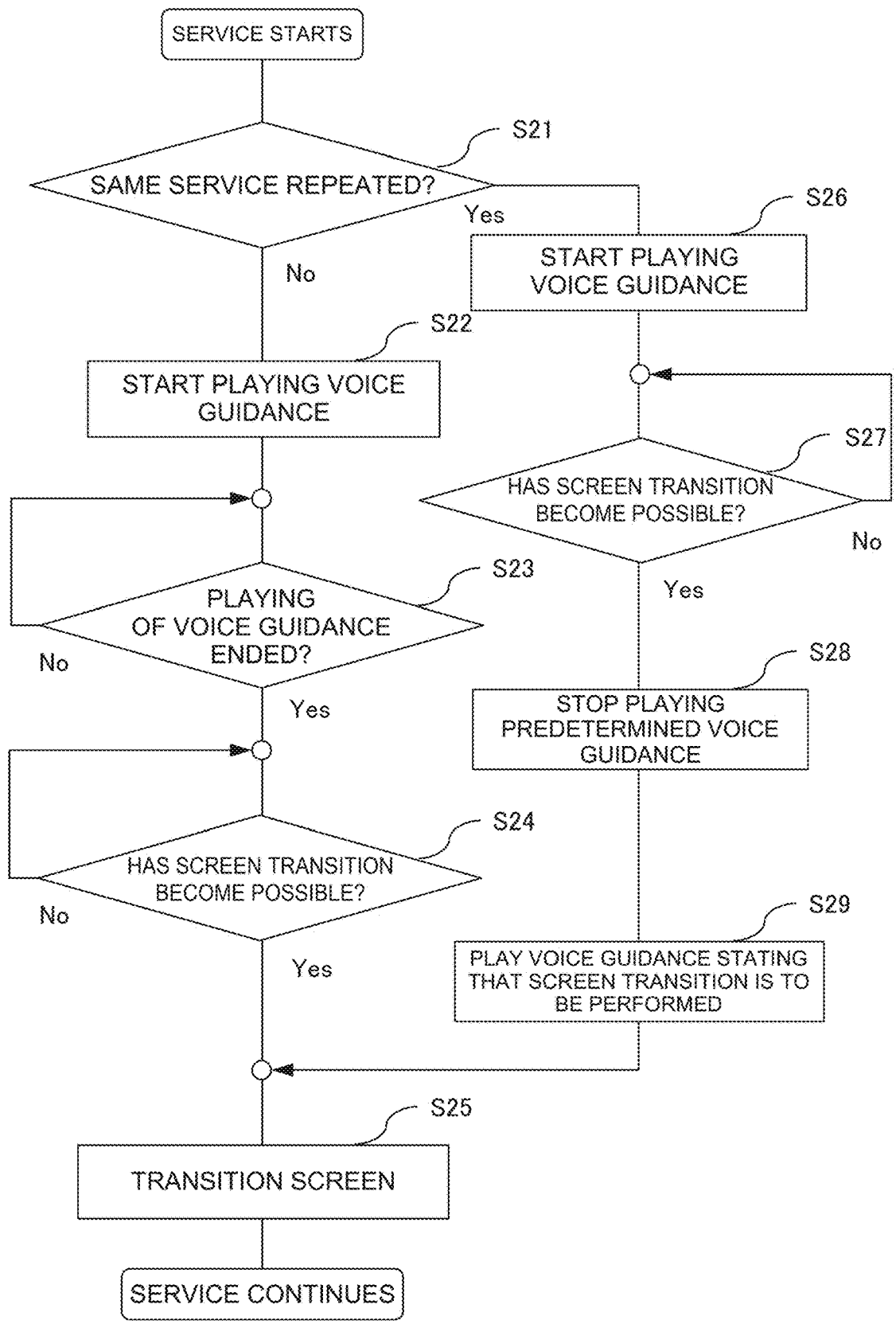
FIG. 16 is a flowchart illustrating a flow of voice guidance processing of the digital multifunction machine according to a third embodiment of the present invention.

FIG. 16 is a flowchart illustrating a flow of voice guidance processing of the digital multifunction machine 1 according to the third embodiment of the present invention.

Processing of steps S21 to S28 in FIG. 16 corresponds to processing of steps S1 to S8 in FIG. 5; therefore, the description is omitted.

Here, processing of step S29 of FIG. 16, which is not described in the first embodiment will be described.

After allowing the notifier 18 to stop playing the voice guidance in step S28 of FIG. 16 (step S28), and in subsequent step S29, the controller 10 allows the notifier 18 to play the voice guidance stating that screen transition is to be performed (step S29).

When playing of the voice guidance is stopped, the notifier 18 additionally plays a predetermined voice guidance, for example, "Data reading ended; therefore, the screen will transition to the next screen." or the like depending on the content of processing.

Thereafter, in step S25, the controller 10 allows the display 171 to transition the screen (step S25).

As just described, when playing of the voice guidance is stopped as soon as the preparation for screen transition is completed in playing of the voice guidance for the second or subsequent times, the additional voice guidance stating that screen transition is to be performed is played so as not to make the user feel uneasy, and thereafter the screen is transitioned. Consequently, the digital multifunction machine 1 capable of playing the voice guidance more conveniently than before can be realized.

Fourth Embodiment

Next, an example of voice guidance processing of the digital multifunction machine 1 according to a fourth embodiment of the present invention will be described based on FIGS. 17 and 18.

The schematic configuration of the digital multifunction machine 1 according to the fourth embodiment is the same as that of the first embodiment (FIG. 4); therefore, the description is omitted.

Figure 17:
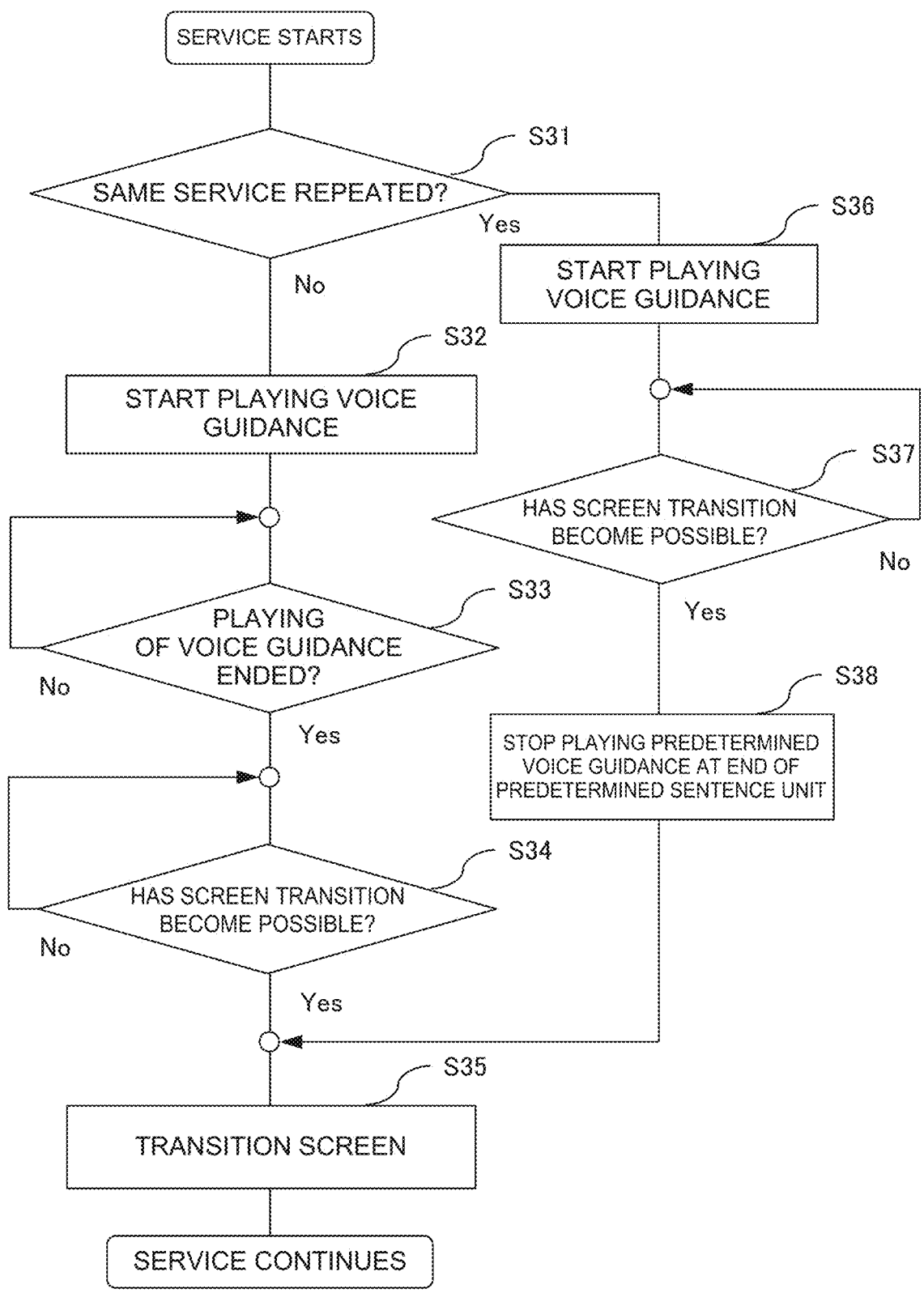
FIG. 17 is a flowchart illustrating a flow of voice guidance processing of the digital multifunction machine according to a fourth embodiment of the present invention.

FIG. 17 is a flowchart illustrating a flow of voice guidance processing of the digital multifunction machine 1 according to the fourth embodiment of the present invention.

Processing of steps S31 to S37 in FIG. 17 corresponds to processing of steps S1 to S7 in FIG. 5; therefore, the description is omitted.

Here, processing of steps S38 and S39 of FIG. 17, which is not described in the first embodiment will be described.

When screen transition has become possible in step S37 of FIG. 17 (when a determination of step S37 is Yes), in step S38, the controller 10 allows the notifier 18 to stop playing the voice guidance at the end of a predetermined sentence unit regardless of whether playing of the voice guidance has ended (step S38).

FIG. 18 is a table illustrating an example of a sentence unit of the voice guidance of the digital multifunction machine 1 according to the fourth embodiment of the present invention.

As illustrated in FIG. 18, the voice guidance is separated into predetermined sentence units "1. Now reading data.", "2. Do not pull the USB memory from the USB port.", "3. After reading ends, the screen will transition.", and the like.

When the notifier 18 stops playing halfway during playing of the voice guidance of each sentence unit, playing of the voice guidance is stopped after the relevant sentence unit is played to the end.

After allowing the notifier 18 to stop playing the voice guidance at the end of the predetermined sentence unit (step S38), in subsequent step S39, the controller 10 allows the notifier 18 to play the voice guidance stating that screen transition is to be performed (step S39).

As just described, when playing of the voice guidance is stopped as soon as the preparation for screen transition is completed in playing of the voice guidance for the second or subsequent times, playing is stopped at the end of the predetermined sentence unit for an appropriate timing. Therefore, the digital multifunction machine 1 capable of playing the voice guidance more conveniently than before without making a user feel uneasy for malfunction or the like can be realized.

Fifth Embodiment

Next, an example of voice guidance processing of the digital multifunction machine 1 according to a fifth embodiment of the present invention will be described based on FIGS. 19 and 20.

The schematic configuration of the digital multifunction machine 1 according to the fifth embodiment is the same as that of the first embodiment (FIG. 4); therefore, the description is omitted.

Figure 19:
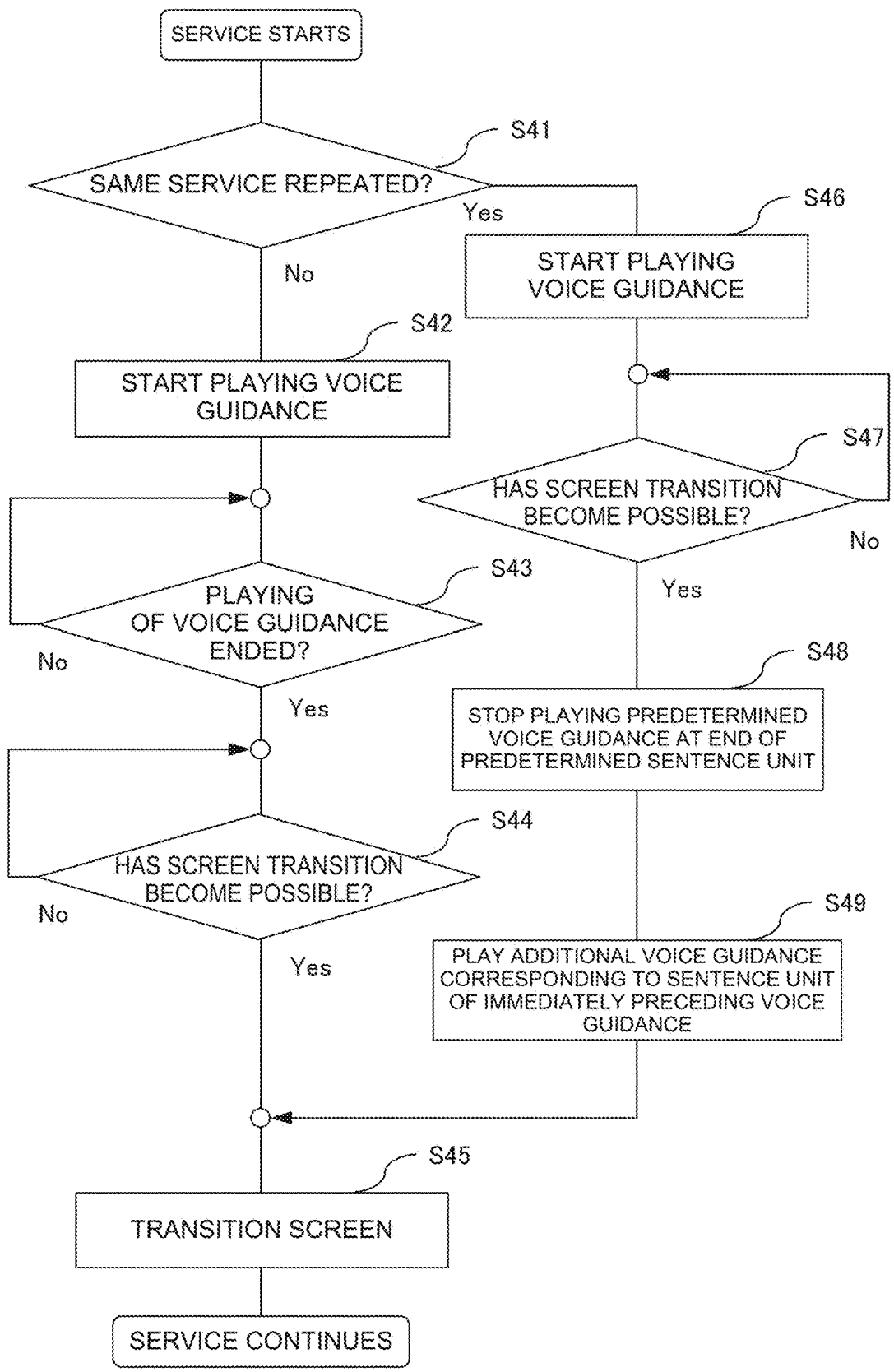
FIG. 19 is a flowchart illustrating a flow of voice guidance processing of the digital multifunction machine according to a fifth embodiment of the present invention.

FIG. 19 is a flowchart illustrating a flow of voice guidance processing of the digital multifunction machine 1 according to the fifth embodiment of the present invention.

Processing of steps S41 to S47 in FIG. 19 corresponds to processing of steps S31 to S37 in FIG. 17; therefore, the description is omitted.

Here, processing of step S49 of FIG. 19, which is not described in the fourth embodiment will be described.

In step S48 of FIG. 19, after allowing the notifier 18 to stop playing the voice guidance at the end of a predetermined sentence unit (step S48), in step S49, the controller 10 plays an additional voice guidance corresponding to the sentence unit of the immediately preceding voice guidance (step S49).

FIG. 20 is a table illustrating an example of a sentence unit of the voice guidance and an additional voice guidance corresponding to the sentence unit of the digital multifunction machine 1 according to the fifth embodiment of the present invention.

In FIG. 20, as in the fourth embodiment, the voice guidance is separated into predetermined sentence units such as "1. Now reading data.", "2. Do not pull the USB memory from the USB port.", "3. After reading ends, the screen will transition.", and the like.

When playing of the voice guidance is ended with "1. Now reading data." as illustrated in FIG. 20, the notifier 18 additionally plays the corresponding voice guidance "Reading ended. The screen will transition.".

Further, when playing of the voice guidance is ended with "2. Do not pull the USB memory from the USB port.", the notifier 18 additionally plays the corresponding voice guidance "Pull out the memory. The screen will transition.".

Furthermore, when playing of the voice guidance is ended with "3. Reading ended. The screen will transition.", the notifier 18 does not play any additional voice guidance.

Thereafter, in step S45, the controller 10 allows the display 171 to transition the screen (step S45).

As just described, when playing of the voice guidance is stopped as soon as the preparation for screen transition is completed in playing of the voice guidance for the second or subsequent times, playing is stopped at the end of the predetermined sentence unit for an appropriate timing and then an additional voice guidance corresponding to the sentence unit of the immediately preceding voice guidance is played. Therefore, the digital multifunction machine 1 capable of playing the voice guidance more conveniently than before without making a user feel uneasy for malfunction or the like can be realized.

The preferred modes of the present invention also include a combination of any of a plurality of modes described above.

Various modifications of the present invention may be implemented besides the above-described embodiments. Such modifications shall not be construed as departing from the scope of the present invention. The present invention shall meanings equivalent to the claims and all modifications within the claims.

What is claimed is:

1. An image forming device; comprising:
an image forming unit that performs image forming;
a notifier that plays a voice guidance of a service related to image forming for a user;
a display that displays a message to the user; and
a controller that controls the image forming unit, the notifier, and the display,
wherein in performing the service related to image forming, the controller allows the notifier to start the voice guidance,
when the service is for a first time to a user, the controller allows the display to transition to a next screen after the voice guidance is played to the end, and when the service is repeated for second or subsequent times to the user, the controller allows the notifier to stop playing the voice guidance halfway after screen transition to the next screen becomes possible, and then the controller allows the display to transition to the next screen.

2. The image forming device according to claim 1, wherein when allowing the notifier to stop the voice guidance halfway and then allowing the display to transition to the next screen, the controller allows the display to display a predetermined message for the screen transition.

3. The image forming device according to claim 1, wherein when allowing the notifier to stop playing the voice guidance halfway, the controller allows the notifier to play an additional predetermined voice guidance for the screen transition.

4. The image forming device according to claim 1, wherein when allowing the notifier to stop playing the voice guidance halfway, the controller allows the notifier to stop playing the voice guidance at the end of a predetermined sentence unit.

5. The image forming device according to claim 4, wherein after allowing the notifier to stop playing the voice guidance at the end of the predetermined sentence unit, the controller allows the notifier to play an additional predetermined voice guidance corresponding to an immediately preceding sentence unit.

* * * * *